Figure 1:
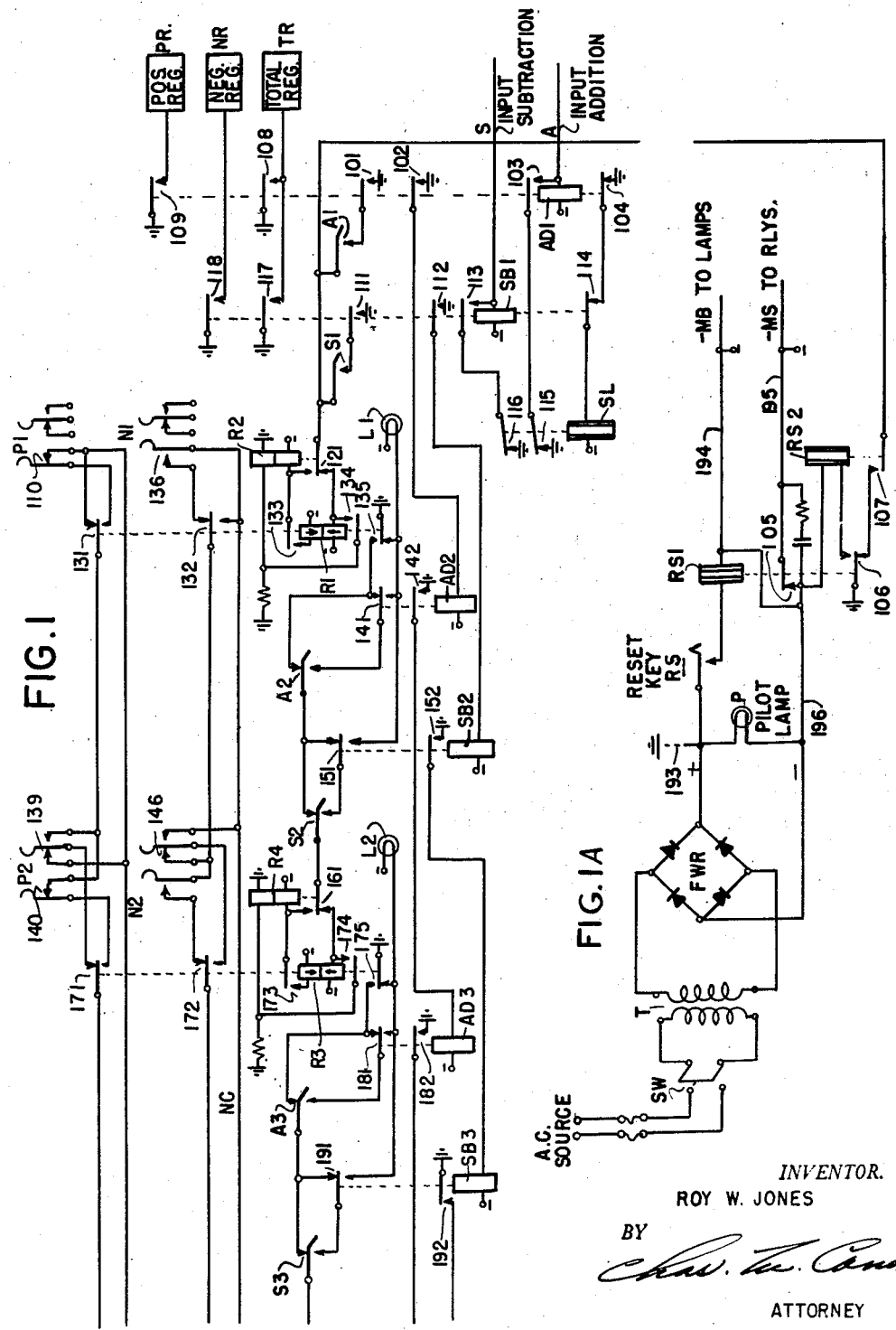

July 10, 1951  R. W. JONES  2,560,172
BINARY BINOMIAL SEQUENTIAL ANALYZER
Filed March 31, 1948  4 Sheets-Sheet 1

INVENTOR.
ROY W. JONES
BY
ATTORNEY

July 10, 1951  R. W. JONES  2,560,172
BINARY BINOMIAL SEQUENTIAL ANALYZER
Filed March 31, 1948  4 Sheets-Sheet 2

FIG. 2

*INVENTOR.*
ROY W. JONES
BY
ATTORNEY

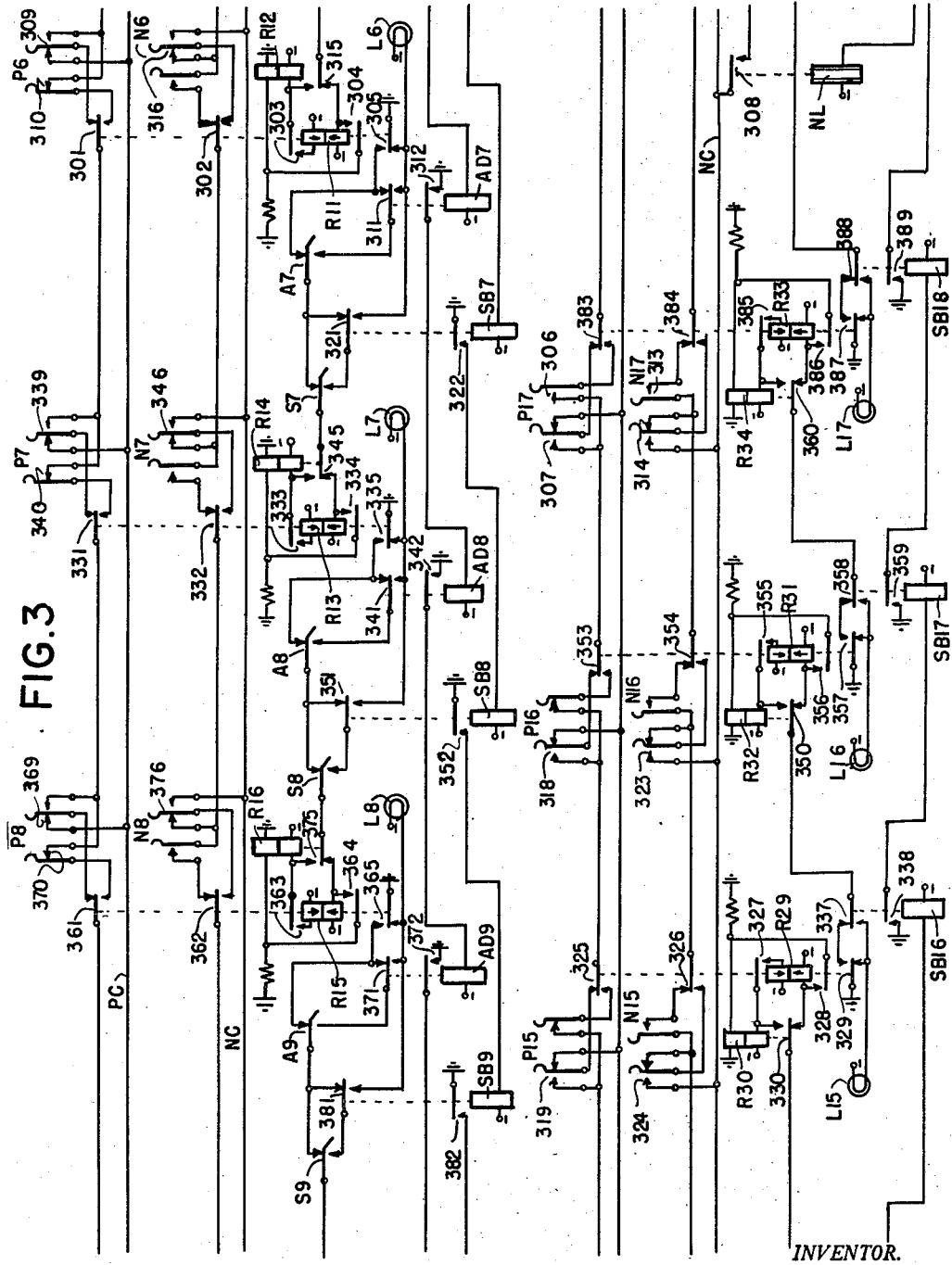

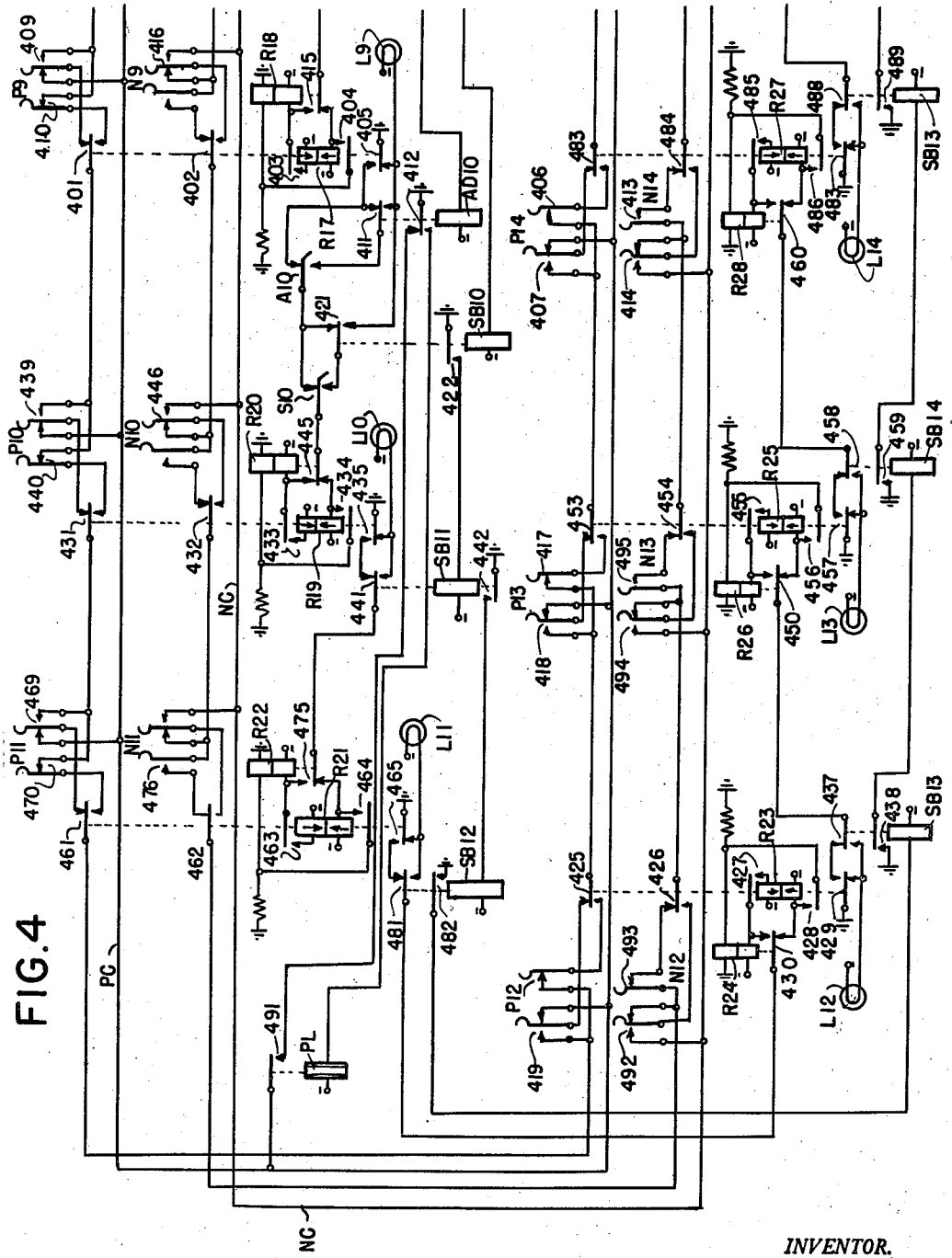

Patented July 10, 1951

2,560,172

UNITED STATES PATENT OFFICE 2,560,172

BINARY BINOMIAL SEQUENTIAL ANALYZER

Roy W. Jones, Rochester, N. Y., assignor to Automatic Electric Laboratories, Inc., Chicago, Ill., a corporation of Delaware Application March 31, 1948, Serial No. 18,265

14 Claims. (Cl. 235—61)

1

The present invention relates in general to adding machines and more particularly to an adding machine of the all-relay binary type arranged to be used as a binomial sequential analyzer.

Briefly, binomial sequential analysis is an analytical method of interpreting inspection and test data according to certain mathematical formulae. It is defined as a statistical test procedure which gives a specific rule, at any stage of the experiment, for making one of the following three decisions: (1) accept the subject matter under test, (2) reject the subject matter under test, (3) continue taking observations.

The process of sequential analysis finds a useful application in the field of production testing and inspection, that is, where a sample is taken from a finished lot of goods and is tested; the passing or rejecting of the finished lot being dependent upon the results obtained from testing the sample. A distinction may be made between a multiple sampling procedure and a sequential procedure in that a multiple sampling procedure eliminates, at a predetermined sample size, the possibility of deciding to obtain further data. Under the sequential plan, the inspection will be terminated as soon as the quality of the sample has been determined within the limits of the probability risks established. The chief merit of sequential analysis, then, is that it may require smaller samples than multiple sampling.

The method of sequential analysis involves the addition of a discrete value for every good sample examined and the subtraction of a predetermined discrete value for every bad sample examined. If a predetermined negative total is reached the lot under inspection is rejected, or if a predetermined positive total is reached the lot is accepted as good. In sequential inspection, the size of the sample, for a particular lot is left undetermined. The sequential procedure is to inspect one piece at a time, inspection being continued until the cumulated evidence is sufficiently strong, one way or the other, for the analyzer to call the lot good or bad. Thus conspicuously good lots are quickly accepted and conspicuously bad lots are quickly rejected. Extensive inspection is needed chiefly by lots of doubtful quality, which is as it should be.

In accordance with the usual practice of any inspection plan certain tolerances are set up in order to classify each sample inspected as to its classification of being good or bad. A sequential analysis plan is completely determined by four established numerical quantities. Two of these

2 quantities specify (1) what is considered a good lot and (2) what is considered a bad lot.

Dependent upon the article being manufactured and in accordance with the usual practice a lot may be arbitrarily termed as acceptable if only a predetermined percentage is bad, while lots with a second predetermined percentage bad are non-acceptable, and lots having percentages bad between the above-mentioned percentages being left indeterminate. The established acceptable percentage for accepting a good lot will now be designated P1 and the established unacceptable percentage for rejecting a bad lot will now be designated P2. P1 therefore equals the percentage bad of a lot which the user is willing to accept as a good lot. P2 then equals the percentage bad of a lot which the user is unwilling to accept and therefore will reject a lot with P2 percentage.

It is well known that in any sampling inspection procedure, where there is not 100% inspection, there is always some possibility, or risk, of making a wrong decision and therefore the two other numerical quantities to be determined in the sequential analysis plan are (3) what risk is the inspector (or user) willing to run of rejecting a good lot, and (4) what risk is the inspector (or user) willing to run of accepting a bad lot.

The user is willing to take a certain percentage risk of rejecting good material, for example, say one chance in a hundred, or .01. This percentage risk will be designated $\alpha$ (the Greek letter "alpha") and in the example given $\alpha = .01$.

The user is also willing to take a different percentage risk of accepting bad material, for example, say two chances in a hundred, or .02. This different percentage risk will be designated $\beta$ (the Greek letter "beta") and in the example given $\beta = .02$.

From the foregoing it will be seen that the tolerated risks are characterized by four numbers P1, P2, $\alpha$ and $\beta$ which are established on a basis of practical considerations commensurate with the item being inspected and will naturally assume different values dependent upon the different types of apparatus or items being inspected. When quantities P1, P2, $\alpha$ and $\beta$ have been established the necessary computations defining sequential inspection can be computed by means of the following formulae which were derived from formulae given in "Sequential Analysis of Statistical Data: Applications," a report prepared by the Statistical Research Group of Columbia University and published by the Columbia University Press, September 1945. Another publication "Sequential Analysis" by Abraham Wald, published in 1947 also deals with this new method of statistical analysis.

In order to perform a sequential analysis four quantities must be known, (1) the additive quantity, (2) the positive limit, (3) the negative limit, and (4) the subtractive quantity. In the present example the subtractive quantity is taken as 75 for all cases. These quantities are determined by the following equations:

$$(1) \quad \text{Additive quantity} = \frac{\log \frac{1-P1}{1-P2}}{\log \frac{P2}{P1}} \times 75$$

$$(2) \quad \text{Positive limit} = \frac{\log \frac{1-\alpha}{\beta}}{\log \frac{P2}{P1}} \times 75$$

$$(3) \quad \text{Negative limit} = \frac{\log \frac{\alpha}{1-\beta}}{\log \frac{P2}{P1}} \times 75$$

where
$P1$=the acceptable quality tolerance limit for the lot, expressed as a fraction defective.
$P2$=the unacceptable quality tolerance limit for the lot, expressed as a fraction defective.
$\alpha$=the maximum risk or probability of rejecting lots of quality $P1$ or better, expressed as a decimal fraction.
$\beta$=the maximum risk or probability of accepting lots of quality $P2$ or worse, expressed as a decimal fraction.

The quantity 75 appearing in the above formulae is a result of arbitrarily choosing the value 75 for the subtractive quantity. Any value desired may be used instead provided that the other quantities are modified accordingly as indicated in the formulae. The additive quantity is generally a decimal fraction of the subtractive quantity, hence the choice of 75 for the subtractive quantity permits the additive quantity to be conveniently expressed as a whole number.

The above-mentioned formulae and the basis for such formulae are not considered part of this invention and are being shown and briefly explained only for the purpose of showing the utility of the calculating machine which comprises applicant's invention.

Having briefly described the system of sequential analysis with which the instant invention is concerned and the mathematical formulae upon which this system of analysis is based and its derivation, the principal object of the present invention is to provide a binary type of automatic adding machine using only relays so arranged as to perform the functions of a binomial sequential analyzer.

Another object of the invention is the provision of a binary type adding machine which will automatically add a predetermined discrete quantity, called the additive quantity, for every additive input transmitted to the machine.

A feature of the invention is the provision of a binary type adding machine which will effectively subtract a predetermined discrete quantity for every subtractive input transmitted to the machine.

A further feature of the invention is the provision of a series of register relays which are sequentially controlled to add binary numbers and to thereby register the resultant amount in binary form.

Another feature is the provision of a chain of register units, sequentially corresponding to the successive binary digit orders in a binary number, in which each register unit is provided with a register relay which is controlled from the next lower order register relay and which extends control to the next higher order register relay and also in which intervening circuit connections are provided at each register unit to control the register relays at such units to add desired predetermined binary numbers.

A still further feature of the invention is the provision of a binary all-relay type adding machine which will give a signal when the cumulative total resulting from the various inputs to the machine has reached a predetermined positive or negative quantity.

A further feature of the invention is the provision of indicating means associated with each register relay and controlled thereby to indicate the binary digits "0" or "1" dependent upon the operated or released condition of such register relay.

GENERAL DESCRIPTION

This binary sequential analyzer is a type of adding machine in which the calculations are performed by relays. It is capable of adding a discrete value each time an electrical circuit is closed to the input circuit for addition and of effectively subtracting another discrete value each time an electrical circuit is closed to the input circuit for subtraction. The calculations start from an initial value of zero. When the total reaches a predetermined discrete positive value, an electrical circuit operates to indicate that the positive limit has been reached. Likewise, when the total reaches a predetermined discrete negative value, another electrical circuit operates to indicate that the negative limit has been reached. The calculations are made in the binary system of arithmetic in which two figures only, "0" and "1," are used in lieu of ten digits; the cipher multiplying everything by 2. Thus 1 is one, 10 is two, 11 is three, 100 is four, etc. In this circuit a register relay at normal is used to indicate the binary figure "1" and when operated indicates the figure "0." Nineteen register relay units are provided which means that binary numbers requiring nineteen or less figures can be registered. $2^{19}$ or 524288, in ordinary arithmetic, is the first number which requires twenty figures in the binary system. Thus 524287 is the largest value which can be totaled by this analyzer. Seventeen lamps are associated with the first seventeen register relays and give a visual indication of the total registered. A dark lamp represents the figure "0" while a lighted lamp represents the figure "1." The maximum total that can be indicated by the lamps is $2^{17}-1$ or 131,071 since $2^{17}$ is the first binary number requiring eighteen figures or digit orders. The positive and negative limits can be set to any desired value between 1 and 131,071.

Each of the nineteen register relay units has associated with it a pair of register relays which are required to provide the necessary electrical operations. Two lever type keys are associated with each of the first seventeen pairs of register relays. These keys are used to establish the positive and negative limits. Also associated with each of said first ten pairs of register relays is a turn key for establishing the subtractive quantity.

There is also a second turn key associated with each register relay pair, up to ten, for establishing the additive quantity. The additive and subtractive quantities are variable between 1 and 1023. The operation of this machine is not reversible and subtractions cannot be made directly. Subtraction is effectively accomplished by adding a large number greater than the machine is capable of handling. When $n$ is the number to be subtracted, the subtraction is obtained by adding the number $524288-n$, or since 75 is the subtractive quantity then $524288-75$ equals $524213$. The number 524213 is therefore added each time the subtractive quantity, or 75, is to be subtracted from the total.

Referring now to the drawings, Figs. 1, 2, 3 and 4 show a series of register relay units, a series of positive limit lever keys P, a series of negative limit lever keys N, addition turn keys A, subtraction turn keys S, a series of adding relays AD, a series of subtraction relays SB, and a lamp for each register unit except the last two register units.

Each register relay unit, comprising a pair of register relays R, corresponds to a different binary digit order and the respective register relay units are connected in a series circuit in accordance with their corresponding binary digit order.

Fig. 1A shows the circuits for providing operating current for Figs. 1, 2, 3 and 4. Associated with each register relay unit, except the last two, is a positive limit key P, which keys are connected in series through contacts of the register relays. These positive limit keys also correspond to successive binary digit orders and are manually set in accordance with a predetermined positive limit binary number.

Also associated with each register unit, except the last two, is a negative limit key N, which keys are connected in series through contacts of the register relays. These negative limit keys correspond to successive binary digit orders and are manually set in accordance with a predetermined negative limit binary number.

Ten addition turn keys A, associated respectively with the first ten register relay units, correspond to succesive binary digit orders and are manually set in accordance with a predetermined additive binary number to control their respective register relays, in case the corresponding key is set in operated position, to add the binary digit 1 to a previous registration therein when the corresponding adding relay AD is operated.

Ten adding relays AD, associated respectively with the first ten register relay units, correspond to successive binary digit orders and are sequentially operated to add the binary digit 1 to its respective register unit in case the corresponding addition key A is set in operated position.

Ten substract turn keys S, associated, respectively, with the first ten register relay units, correspond to successive binary digit orders and are manually set in accordance with a predetermined subtractive binary number to control their respective register relays, in the event that the corresponding subtract key S is set in operated position, to add the binary digit 1 to a previous registration therein when the corresponding subtract relay SB is operated.

Nineteen subtract relays SB, associated respectively with register relay units, correspond to successive binary digit orders and are sequentially operated to cause a predetermined binary number to be added to the total registered in the register units.

The first ten subtract relays SB each cause the binary digit 1 to be added to its corresponding register unit only in case the corresponding subtract key S is manually set to its operated position. The remaining subtract relays, upon operation, each causes the binary digit 1 to be added to its respective register unit and therefore the eleventh to the nineteenth subtract relays each automatically adds the binary digit 1 to its corresponding register unit.

It should be mentioned at this time that both the addition and subtract relays AD and SB are considerably slower to operate than the register relays, so that, after an operation of one of the addition or subtract relays, several register relays can operate, if necessary, before the succeeding addition or subtract relay in the chain is operated. This difference in the operate time of the register relays and the addition or subtract relays is to provide time to allow the register relays to operate and register carryovers from one register unit to the next.

A lamp is associated with each of the first seventeen register relay units and such lamps are controlled by their respective odd register relays R. A dark lamp indicates registration of the binary digit "0" while a lighted lamp indicates the registration of the binary digit "1."

Fig. 1 also shows an additive input conductor A which may be grounded in any desired manner each time an additive input is transmitted to the machine. A subtractive input conductor S may also be grounded in any desired manner each time a subtractive input is transmitted to the machine. A positive register PR is shown in Fig. 1 to register the number of times an additive input is received by the machine. A negative register NR is also provided to register the number a negative input is received by the machine. A total register TR is provided for registering the sum of both the positive and negative inputs received by the machine.

In Fig. 2 there is shown a positive limit relay PS which is operated when the register units reach the binary number set up on the operated positive limit keys P and a positive limit register PLR which operates each time the positive limit is reached by the register relays. Fig. 2 also shows a negative limit relay NS which is operated when the register units reach the binary number set up on the operated negative limit keys N and a negative limit register NLR which operates each time the register relay units reach the negative limit. Lamps PSL and NSL are respectively lighted when the positive and negative limits are reached. Contacts 294 to 297 are provided to control remote negative and positive signals, if desired.

Fig. 1A shows the means for providing direct ground and battery connections for operating the relays and lamps derived from an alternating current source by means of the full-wave rectifier FWR, transformer T and switch SW. The grounded conductor 193 is connected to all the ground symbols throughout the drawings. The battery lead 194 is connected to all the battery symbols shown at the lamps and the battery lead 194 is connected to all battery symbols shown at the various relays.

A reset key RS is shown in Fig. 1A which is momentarily operated to cause the operation of reset relays RS1 and RS2 which in turn transmits a momentary ground pulse to register relay R1 to cause its operation and the operation of all succeeding odd numbered register relays R in the successive register relay units.

Having briefly described the drawings a better understanding of the invention will be had by explaining the operation of the machine for a specific example. Let it be assumed that the additive quantity as computed by equation "1," previously set forth, equals 7 which translated into binary figures is 111. The additive turn keys A1, A2 and A3, corresponding to first, second and third binary digit order, are set to their operated positions. The other additive turn keys A4 to A10, inclusive, remain set in normal, or zero, positions. With keys A1, A2 and A3 set in their operated positions, each additive input to the machine adds the binary number 111 to a previous registration in the register relay units.

The positive limit as computed by equation "2" is assumed to be 51,200, or 01100100000000000 in binary figures. The positive limit keys P16, P15 and P12 are manually set to their operated positions while the remaining positive limit keys P1 to P11, inclusive, P13, P14 and P17 remain set in their normal, or zero, positions. With the positive limit keys set in this order the positive limit is set for 51,200.

The negative limit as computed by Equation 3 is also assumed to be 51,200. In order to set up the negative limit of 51,200, such number must be interpreted in terms of a negative total. To arrive at this interpreted negative total, the predetermined negative limit 51,200 is subtracted from 131,072 (which is $2^{17}$). 131,072 minus 51,200 equals 79,872. The binary number corresponding to 79,872 is 10011100000000000. In accordance with this binary number the negative limit keys N17, N14, N13 and N12 are set to their operated positions while the remaining N keys are set to their normal, or zero positions.

As previously described the subtractive quantity is determined as 75 and to subtract this number it is necessary to add 524288−75 or 524213. The binary number corresponding to 524213 is 1111111111110110101. The register relay units corresponding to the eleventh to the nineteenth binary digit orders are arranged to automatically add the binary number 523,264, or binary number 1111111110000000000 for each subtractive input received. 524288−523,264 is 1024. It is now necessary to add 1024−75, which equals 949, in order to reach 524213. 949 translated into a binary number is 1110110101. Subtractive turn keys S are associated with only the first ten register relay units and in order to subtract 75 for each subtractive input received it is necessary to operate the S keys in accordance with the binary number 1110110101. Therefore, keys S10, S9, S8, S6, S5, S3 and S1 are manually set to their operated positions while the keys S7, S4 and S2 are maintained in their normal, or zero positions. Since the register relay units corresponding to the eleventh to the nineteenth binary digit orders are arranged to automatically add the binary number 1111111110000000000 and the S keys S1, S3, S5, S6, S8, S9 and S10 are set in their operated positions, the binary number 1110110101 is also added each time a subtractive input is received by the machine. The sum of these two binary numbers is 1111111111110110101, or the decimal number 524213, which equals 524288−75.

As previously stated the positive and negative limits may be set to any value from 1 to 131,071 the additive and subtractive quantities may also be varied between 1 and 1023 in accordance with the previously mentioned formulae to meet the desired analysis. In the example about to be described the analyzer is operated from an automatically operated machine which has a gauge which automatically tests each finished part after each operation and which transmits a ground pulse over the additive input lead A each time the gauge passes a good part and which also transmits a ground pulse over the subtractive input lead S each time the gauge rejects a bad part. In this example the positive and negative limits have both been determined as 51,200, the additive input as 7 and the subtractive input as 75.

In order the connect direct current derived rfom the commercial AC source to the circuits, switch SW is operated thereby connecting the alternating current source to the transformer T which by means of the full-wave rectifier FWR connects positive direct current (hereinafter called ground) to conductor 193 and to all the ground symbols shown throughout the drawings, and connects negative direct current (hereinafter called battery) to conductors 194 and 195 and to all the battery symbols throughout the drawings. Pilot lamp P is now lighted over an obvious circuit to advise the operator that operating direct current is connected to the machine. The connection of negative battery potential to conductor 194 completes circuits for lighting all of the lamps L1 to L17, inclusive, over obvious circuits extending from back contacts on the odd numbered register relays, for example from ground (193) back contacts 135 and through lamp L1 to negative battery (194). The illumination of all these lamps advises the operator that all lamps are in proper working condition and are not burned out. Slow to release relay SL is operated over contacts 104 and 114 to prepare at contacts 116 and 115 locking circuits for relays SB1 and AD1.

As previously stated positive limit lever keys P16, P15 and P12 are manually set by the operator in accordance with the binary number 01100100000000000 (decimal number 51,200); the negative limit lever keys N17, N14, N13 and N12 are set in accordance with the binary number 10011100000000000 (decimal number 79,872), the subtractive turn keys S10, S9, S8, S6, S5, S3 and S1 are set in accordance with binary number 1110110101 (decimal number 949), and the addition turn keys A1, A2 and A3 are set in accordance with the binary number 111 (or 7).

To put this device into operation initially or to start a new series of observations, the reset key RS is momentarily operated. In response to the operation of reset key RS a circuit is completed for operating slow-to-release reset relay RS1 from ground (193) key RS, winding of relay RS1 to battery (196). At contacts 105 relay RS1 disconnects negative battery conductor 196 from conductor 195 to thereby remove battery potential from all the relays. At contacts 106 relay RS1 closes an obvious circuit to operate slow-to-release relay RS2. Relay RS2 operates and at contacts 107 prepares a circuit for operating the first odd register relay R1.

When the operator observes that all of the lamps L1 to L17 are illuminated and in proper operating condition she will restore the reset key RS to normal to open the circuit of relay RS1 which restores after a short interval of time. At contacts 105 relay RS1 connects conductor 196 to conductor 195 to thereby connect battery potential to all of the register relays. At make contacts 106 relay RS1 opens the circuit to relay RS2. Relay RS2 due to its slow-to-release characteristics holds its contacts 107 closed for an interval before restoring and at this time a momentary circuit may be traced for operating relay R1 as follows: from ground, back contacts 106, 107, 121 and through the lower winding of relay R1 to battery. Relay R1 operates contacts 131 and 132 to prepare circuits in the positive limit and in the negative limit test circuits, respectively. At contacts 133 relay R1 prepares a circuit for its upper winding, at contacts 134 completes a locking circuit for its lower winding through the upper winding of relay R2 to ground and in parallel through the associated resistance to ground, at back contacts 135 extinguishes lamp L1 and at make contact 135 completes an energizing circuit for relay R3. Relay R2 is not energized at this time because its upper winding is short circuited over the initial energizing circuit of relay R1 and contacts 134. The circuit for energizing relay R3 extends from ground at make contacts 135, back contacts 141, operated add key A2, unoperated subtract key S2, back contacts 161 and through the lower winding of relay R3 to battery. In a similar manner relay R3 at contacts 171 and 172 prepares circuits in the positive and negative limit circuits, at 173 prepares a circuit for its upper winding, at 174 prepares a circuit for locking relay R3 in series with the upper winding of relay R4 when the operating ground is removed from make contacts 135, and at 175 extinguishes lamp L2 and completes the energizing circuit for relay R5. The circuit for relay R5 extends from ground, 175, 181, operated add key A3, 191, operated subtract key S3, 215 and through the lower winding of relay R5 to battery. Each succeeding odd register relay R7 to R37, inclusive, is operated over a similar circuit from the preceding odd register relay. Relays R5, R7, R9, R11, R13, R15, R17, R19, R21, R23, R25, R27, R29, R31, R33, R35 and R37 are locked in energized position through their lower windings and also extinguish their associated lamps. All of the odd register relays R1 to R37 are now locked operated and all of the lamps L1 to L17 are extinguished. When slow-to-release relay RS2 finally restores and opens the original energizing circuit of relay R1, the short circuit through the upper winding of relay R2 is removed with the result that relay R2 now energizes in series with the lower winding of relay R1. This circuit may be traced from ground through the upper winding of relay R2, contacts 134 and through the lower winding of relay R1 to battery. At contacts 121 relay R2 opens the original energizing circuit through the lower winding of relay R1 and prepares circuits through its lower winding and the upper winding of relay R1. Since relay R1 is maintained operated through relay R2, relay R1 at make contacts 135 maintains the upper winding of relay R4 short circuited and relay R3 energized until the short circuit around the upper winding of relay R4 is opened. In a similar manner the upper windings of all the even numbered register relays R6, R8 etc., are short circuited from the preceding odd register relays.

The calculator is now ready to receive additive inputs over the additive lead A and subtractive inputs over the subtractive lead S.

ADDITIVE INPUT

When the additive input lead A is momentarily grounded the first add relay AD1 is operated over an obvious circuit and at contacts 103 completes a locking circuit for itself from ground at contacts 115. At contacts 109 relay AD1 completes a circuit to operate the positive register PR and at 108 completes a circuit to operate the total register TR. At contacts 101 relay AD1 completes a circuit for holding relay R2 operated and for kicking differential relay R1 down to its released position, at 102 completes the circuit for operating the second add relay AD2 and at 104 opens the energizing circuit to the slow-to-release relay SL. Relay SL is made slow to release in order to hold add relay AD1 operated for a short interval of time from contacts 115 after the ground on the input lead A has been removed. As previously mentioned it should be borne in mind that the add and subtract relays, AD and SB, have an operate time somewhat greater than twice the operate time of the register relays to thereby permit sufficient time for operation of one or more register relays before the successive add or subtract relay is operated. The circuit for holding relay R2 operated extends from ground at 101, operated key A1, make contact 121 and through the lower winding of relay R2 to battery. An extension of this circuit extends from make contact 121, contacts 133 and through the upper winding of relay R1 to battery. Relay R1 is a differential relay and since both of its windings are energized in opposition the relay is operated to its released position and at back contacts 135 lights lamp L1. The opening of make contacts 135 removes the short-circuit from ground relay R4 with the result that relay R4 now energizes in series with the lower winding of relay R3 as follows: ground through upper winding of relay R4, contacts 174 and through the lower winding of relay R3 to battery. At contacts 161 relay R4 prepares a circuit for maintaining itself operated and for releasing differential relay R3. Shortly after the release of relay R1 and the operation of relay R4 the second add relay AD2 is operated from ground at contacts 102.

Relay AD2 at contacts 141 completes a circuit for holding relay R4 operated and for releasing relay R3 as follows: from ground back contacts 135, make contacts 141, operated key A2, key S2, make contact 161 where the circuit divides one branch extending through the lower winding of relay R4 to maintain R4 operated and the other branch extending through 173 and upper winding of relay R3 to battery. Relay R3 releases and opens the short circuit around the upper winding of relay R6 with the result that relay R6 is now operated in series with the lower winding of relay R5 over contacts 204 and at back contacts 175 lights lamp L2. Relay AD2 also at contacts 142 completed the circuit for operating the third add relay AD3 but this relay did not fully operate until after the succeeding register relays had performed the above described operations.

Relay AD3 at make contacts 181 completes a circuit for holding relay R6 operated and for releasing relay R5 as follows: from ground back contacts 175, make contacts 181, operated key A3, contacts 191, operated key S3, make contacts 215 where the circuit divides, one branch to the lower winding of relay R6 and the other branch extending through contacts 203 to the upper winding of relay R5 to battery. Relay R5 releases contacts 205 to light lamp L3 and to remove the short-circuit around the upper winding of relay R8 whereupon relay R8 operates in series with relay R7 as follows: ground upper winding of R8, contacts 234 and lower winding of R7 to battery. Relay AD3 also at contacts 182 completes the circuit for operating the fourth add relay AD4 which relay is not fully operated until after the above mentioned register relays have operated.

Relay AD4 closes its make contacts 211 without result at this time because the associated add key A4 is not operated and at 212 completes a circuit for operating the succeeding add relay AD5. In a similar manner successive AD relays AD6 to AD10, inclusive, are energized at this time without result. Each time relay AD10 operates it completes a circuit for the positive limit test relay PL at make contacts 412. At contacts 491 relay PL prepares a point in the circuit to determine if the positive limit has been reached, but the circuit to the positive limit relay PS is not completed until the positive limit number is reached or exceeded as will be more fully described hereinafter.

Slow-to-release relay SL releases a predetermined time after its circuit is opened at contacts 104 and at contacts 115 opens the locking circuit of AD1 which restores. Relay AD1 at contacts 108 and 109 opens the circuits to the registers TR and PR, at 101 opens the holding circuit through the lower winding of R2 to release R2, at 102 opens the circuit to AD2 to release AD2, at 103 opens a point in its own locking circuit and at contacts 104 reenergizes relay SL.

Relay AD2, upon restoring, at contacts 141 opens the holding circuit of relay R4 which releases and at 142 opens the circuit to AD3 which restores. Relay AD3 at 181 opens the holding circuit of R6 which restores and at contacts 182 opens the circuit of relay AD4 which releases. Relays AD4, AD5, AD6, AD7, AD8, AD9, AD10 and PL release in succession and in the order named without result at this time. In response to the first additive input relays R1, R3, R5 have been restored while all other odd register relays are operated and relay R8 is the only even register relay which at this time is operated. The restoration of odd register relays R1, R3 and R5 have lighted lamps L1, L2 and L3 to indicate the registration of the binary number 111 (decimal digit 7).

In response to the next, or second, additive ground pulse received over additive lead A relay AD1 is again operated and again locks at 103 over 115. The PR and TR registers are again operated at contacts 109 and 108. At 101 relay R1 is again operated while at 102 the circuit is closed for relay AD2. Relay R1 at make contacts 135 again completes the circuit to operate R3 and relay R3 at make contacts 175 again completes the circuit to operate R5. Relay R5 at make contacts 205 completes a circuit for holding the lower winding of relay R8 energized and completes a circuit through the upper winding of differential register relay R7 over keys A4 and S4, make contact 245 and 233. Since the upper and lower windings of relay R7 are in opposition relay 7 releases and at make contacts 235 removes the short-circuit from around the upper winding of relay R10 to thereby permit relay R10 to energize its upper winding in series with the lower winding of relay R9 whereby relay R10 is energized while relay R9 is maintained operated. Shortly after the operation of those register relays the second add relay AD2 is operated from contact 102 of AD1.

Relay AD2 at contacts 141 removes the short circuit from around the upper winding of relay R4 to thereby energize relay R4 in series with relay R3 and at contacts 142 completes the circuit for relay AD3. Relay AD3 at contacts 181 removes the short circuit from around the upper winding of relay R6 to thereby energize relay R6 in series with the lower winding of relay R5 and at contacts 182 completes the circuit for relay AD4. The operation of relays AD4 to AD10 again are without effect at this time. Slow-to-release relay SL also releases and opens the locking circuit to relay AD1 which restores to open the circuits to registers, to open the circuit of AD2 and to reenergize SL.

When ground is removed at contact 101 by the release of relay AD1 the short circuit around the upper winding of relay R2 is removed with the result that relay R2 energizes in series with the lower winding of relay R1 which is maintained operated. Relay AD2 releases when its circuit is opened at contacts 102 by relay AD1 and at back contacts 141 completes a circuit through the lower winding of relay R4 to maintain it operated and also completes a circuit by way of contact 173 through the upper winding of differential register relay R3 to cause the release of relay R3. Relay R3 upon restoring, at back contacts 175, make contacts 181, operated add key A3, back contacts 191, operated key S3, make contact 215 and contacts 203 completes the circuit through the upper winding of differential relay R5 to cause it to restore while relay R6 is held operated. The restoration of relay R5 at contacts 205 opens the holding circuit of relay R8 to cause relay R8 to restore. Relay AD3 releases shortly after the operations of these last mentioned register relays when its circuit is opened at contacts 142 by the release of relay AD2. At contacts 181 relay AD3 opens the holding circuit of relay R6 which releases and at contacts 182 opens the circuit to add relay AD4. Add relays AD4 to AD10 successively restore without effect at this time. From the foregoing it will be seen that in response to the receipt of the second additive input odd register relays R3, R5, R7 are in released position while all other odd register relays are energized with the result that lamps L4, L3, and L2 are lighted to indicate the binary number 1110, which is the equivalent of the decimal number 14. Thus two additive inputs have been added, or binary number 111 (decimal 7) plus binary number 111 (decimal 7) equals binary number 1110 (decimal 14). The even numbered register relays R2, R4 and R10 are the only even numbered register relays in operated position.

In response to the third additive ground pulse received over the additive lead A relay AD1 is again operated and again locks over 115 and operates the associated registers PR and TR as well as completing a circuit for the second add relay AD2. At contacts 101 relay AD1 completes a circuit for holding relay R2 energized through its lower winding and also completes a circuit by way of contacts 133 through the upper winding of relay R1. Relay R1, being a differential relay, restores and at contacts 135 disconnects ground from the lower winding of relay R4 to cause relay R4 to restore. Shortly after the release of relay A4, relay AD2 is operated to cause the operation of relay R3 over the following circuit: from ground back contacts 135, make contacts 141, operated key A2, key S2, back contacts 161 and through the lower winding of relay R3 to battery. Relay R3 operates its contacts 174 to short circuit the upper winding of relay R4 and at make contacts 175 completes a circuit for operating relay R5 as follows: from ground make contacts 175, back contacts 181, operated key A3, back contacts 191, operated key S3, back contacts 215 and through the lower winding of relay R5 to battery. At contacts 204 relay R5 shorts the upper winding of relay R6 and at contacts 205 completes a circuit for operating relay R7 from ground, make contacts 205, keys A4 and S4, back contacts 245 and through the lower winding of relay R7 to battery. Relay R7 at contacts 234 shorts relay R8 and completes a circuit for holding relay R10 energized and for releasing relay R9 as follows: from ground, make contacts 235, key A5, back contacts 251, operated key S5, make contacts 275 when the circuit divides, one branch extending through the lower winding of relay R10 to hold this relay operated and the other branch extending by way of contacts 263 and the upper winding of relay R9 to battery. Relay R9, being a differential relay, releases when both its windings are energized in opposition. Relay R9 at contacts 265 removes the short circuit from around the upper winding of relay R12 whereupon relay R12 now energizes in series with the lower winding of relay R11.

Relay AD3 operates a predetermined time after its circuit is closed by relay AD2 at contacts 142 and at contacts 181 removes the short from around the upper winding of relay R6 to permit relay R6 to energize in series with relay R5. Relays AD4 to AD10 operate in succession without result at this time because the associated add keys are not operated.

A predetermined time after the operation of relay AD1 slow-to-release relay SL releases and opens the locking circuit of relay AD1 which thereupon restores. At contacts 101 relay AD1 opens the holding circuit of relay R2 which restores and at contacts 102 opens the circuit of relay AD2 which restores. Relay AD2 at contacts 141 opens the short circuit around the upper winding of relay R4 to permit relay R4 to operate in series with the lower winding of relay R3. At contacts 142 relay AD2 opens the circuit to relay AD3 which restores. Relay AD3 at back contacts 181 closes a circuit for holding relay R6 operated and for releasing relay R5 as follows: from make contacts 175, back contacts 181, operated key A3, back contacts 191, operated key S3, make contacts 215 where the circuit divides one branch extending through the lower winding of relay R6 to hold R6 operated and the other branch extending by way of contacts 203 and the upper winding of relay R5 to battery. Relay R5, being a differential relay release its operated contacts in response to the closure of this circuit. At contacts 235 relay R7 removes the short circuit from around the upper winding of relay R8 whereupon relay R8 energizes over its upper winding in series with the lower winding of relay R7. Relays AD4 to AD10 restore successively without result at this time.

From the foregoing it will be seen that in response to the receipt of the third additive input the odd register relays R1, R5 and R9 are in released position while all the other odd register relays are energized with the results that lamps L1, L3, and L5 are lighted to indicate the binary number 10101, which is equivalent to the decimal number 21. Thus three additive inputs have been added to register binary number 10101. The even numbered register relays R4, R6, R8, R10 and R12 are the only even numbered register relays in operated position.

Each register unit comprises an odd register relay and an even register unit, such as relays R3 and R4 in the second register unit, and these relays can be operated in three different manners from ground extending from contacts on the odd register relay of the preceding register unit, such as ground at contacts 135 of register relay R1. One manner of operation results from a carry-over operation when the preceding odd register relay (R1) changes its position. Another manner of operation results from the operation of the associated add relay AD2 in case the associated add key A2 is operated, otherwise without the operation of the associated add key the operation of the associated add relay is without effect. The third manner of operation results from the operation of the associated subtract relay SB2 in case the associated subtract key S2 is operated, or if the subtract key S2 is not operated then the operation of subtract relay SB2 is without effect. Only the first ten register units are provided with add and subtract keys (A and S) and therefore when the add and subtract relays associated with these register units are operated, the associated register relays are controlled by these add or subtract relays only in case the corresponding add or subtract key is operated. The remainder of the register relay units, comprising the eleventh to the nineteenth register units, are not provided with any add or subtract keys but the subtract relays are connected in the circuit of each register unit so as to control the associated register relays for each operation of the subtract relays.

With the above explanation in mind and since each register relay unit is practically identical except for the above noted differences it is believed unnecessary to fully explain the detail operations of all the register relay units since their operations are similar. It is believed sufficient if the detail circuit operations for one of the register relay units is fully explained. As an example the second register relay unit, comprising register relays R3 and R4, will be taken for this purpose. As previously described, all of the odd register relays have been operated in response to the operation and release of reset key RS and relay R3 is energized through its lower winding from ground at contacts 135 from the preceding register relay R1. This circuit may be traced from ground make contacts 135, back contacts 141, operated key A2, key S2, back contacts 161, and through the lower winding of relay R3 to battery. Relay R3 at contacts 174 closes a short-circuit around the upper winding of relay R4 from ground at 135. Now in case ground extending from contacts 135 is disconnected from the lower winding of relay R3 and the upper winding of relay R4 relay R4 is energized in series with relay R3. This disconnection of ground can take place in a number of ways, for example, the preceding register relay R1 could be released to effect a carryover operation or by the operation of the associated add relay AD2 operating contacts 141, and in case the associated subtract key S2 is operated by the operation of subtract relay SB2 operating contacts 151.

The register relays R3 and R4 are now in operated position and when ground is connected to contact 161 by the operation of either the add or subtract relays or by the operation of the preceding register relay, relay R4 is held through its lower winding while a circuit is completed by way of contacts 173 through the upper winding of relay R3. Relay R3, being a differential relay, releases its operated contacts with the result that only relay R4 is held operated. Now when ground is removed from contacts 161 by the operation of either the add, subtract or preceding register relay, relay R4 releases its operated contacts.

Both relays R3 and R4 are now in deenergized position and, when contacts 161 are again grounded by the operation of either the add, subtract or preceding register relay, relay R3 is energized through its lower winding to again operate its contacts. The relays R3 and R4 have now gone through a complete cycle of operation and the operations from here on are the same as previously described. From the foregoing description it will be seen that the odd register relay R3 is restored for each odd ground pulse received and is operated for each even ground pulse it receives and that it lights lamp L2 in its restored position to indicate the binary numeral 1 for this particular digit order. All of the other register relay units operate in a similar manner and it is therefore believed unnecessary to describe the detail operations of all the register relay units.

POSITIVE LIMIT

The additive inputs continue until the positive limit is reached or exceeded. Since the positive limit has been set at binary number

1100100000000000

(decimal 51,200) then the highest number that can be registered is 1100011111111110 (decimal 51,198) before the positive limit is reached. Assuming now that the binary number

1100011111111110

(51,198) has been registered on the register relay units by successive additive inputs. In this case the following odd register relays are in released positions: R3, R5, R7, R9, R11, R13, R15, R17, R19, R21, R29 and R31 to light their associated lamps L2, L3, L4, L5, L6, L7, L8, L9, L10, L11, L15, and L16 to register this binary number.

In response to the next additive input the binary number 111 (decimal 7) is added to the previously registered binary number

1100011111111110

(51,198) resulting in binary number

1100100000000101

(decimal 51,205) and the following odd register relays are in their released positions: R1, R5, R23, R29 and R31. These released relays light their associated lamps L1, L3, L12, L15 and L16 to register binary number 1100100000000101 (decimal 51,205).

As previously described when the tenth add relay AD10 is operated positive test limit relay PL is operated from ground at make contacts 412 and when relay AD10 releases a circuit is completed before the slow-to-release relay PL releases for positive limit relay PS as follows: ground at back contact 412, contacts 491, positive test control conductor PC (to Fig. 2), normally closed contacts 209 of key P3, back contacts 201 of released register relay R5, contacts 240 of key P4, make contacts 231, contacts 270 of key P5, make contacts 261, contacts 310 of key P6, make contacts 301, contacts 340 of key P7, make contacts 331, contacts 370 of key P8, make contacts 361, contacts 410 of key P9, make contacts 401, contacts 440 of key P10, make contacts 431, contacts 470 of key P11, make contacts 361, closed contacts 419 of P12, back contacts 425 of released register relay R23, contacts 417 of key P13, make contacts 453, contacts 406 of key P14, make contacts 483, closed contact 319 of operated key P15, back contact 325 of released relay R29, closed contact 318 of operated key P16, back contact 353 of released relay R31, contacts 306 of key P17, make contact 383, make contact 225, contact 253 and through the upper winding of relay PS to battery. Relay PS operates over the above traced circuit. The reason relay PS did not operate on the registration just before this last additive input is because relay R23 was energized and therefore the circuit to relay PS was open at back contacts 425. Positive limit relay PS, upon operating, at contacts 283 completes an obvious circuit for operating the positive limit register PLR to register the number of times that the positive limit has been reached. At contacts 284 relay PS completes a locking circuit for itself, at contacts 285 lights the positive limit lamp PSL, and at contacts 296 and 297 controls external circuits for controlling other positive limit signals or apparatus, if desired.

Since the positive limit has been reached, the operator may stop further inspection at any time by pulling the switch SW to thereby disconnect ground and battery from the relays and circuits to thereby release all operated relays and to extinguish all lamps. By the operation of lamp PSL the operator is advised that the batch under inspection is good.

It should be understood that during the above described inspection a bed sample may also be tested in which case a ground pulse is connected to the subtract input lead S instead of the additive input lead A.

SUBTRACTIVE INPUT

It should be remembered that the subtract keys S1, S3, S5, S6, S8, S9 and S10 have been operated and that the subtract relays are so wired as to add the binary number 1111111111110110101 (decimal number 524,213) to any previous registration to effectively subtract the binary number 1001011 (decimal number 75) from such a total. However, it may so happen that no registrations, or a total of additive registrations less than the decimal number 75 have been registered in the machine in which case the machine registers an ambiguous number easily noted by the excessive lighting of the register lamps. In order to describe this condition it will first be assumed that no registrations have taken place and that the switch SW and reset key RS have been operated as previously described to energize all of the odd register relays R1 to R37, inclusive, and relay R2.

When the subtractive input lead S is momentarily grounded relay SB1 energizes and locks operated to contacts 116 by way of contacts 113. At contacts 118 relay SB1 completes a circuit for operating the negative register NR to register each received subtractive input, at 117 operates the total register TR, at contacts 111 completes a circuit for holding relay R2 and for releasing relay R1, at contacts 112 completes the circuit for operating the second subtract relay SB2, and at 114 opens the circuit to the slow-to-release relay SL. The circuit for holding relay R2 operated and for releasing relay R1 extends from ground at contacts 111, operated key S1, make contact 121 where the circuit divides one branch extending through the lower winding of relay R2 to battery and the other branch extending by way of 133 and the upper winding of relay R1 to battery. Since both windings of relay R1 are now energized in opposition relay R1 releases.

Relay R1 at make contacts 135 removes the short-circuit from around the upper winding of relay R4 with the result that the upper winding of relay R4 is energized in series with the lower winding of relay R3 over contacts 174 to cause relay R4 to operate and relay R3 to be held operated.

Shortly after relay R4 operates relay SB2 is operated from contacts 112 and since the subtract key S2 is not operated the operation of relay SB2 is without effect except for closing the circuit to the third subtract relay SB3.

The operation of relay SB3 at contacts 191 opens the short-circuit around the upper winding of relay R6 whereupon relay R6 energizes in series with relay R5 over contacts 204 thereby operating relay R6 and maintaining relay R5 operated. At contacts 192 relay SB3 closes the circuit to relay SB4 over an obvious circuit.

Relay SB4 operates and since subtract key S4 is not operated no circuit changes take place in the register relays. At contact 222 relay SB4 closes the circuit to relay SB5.

Relay SB5, upon operating, at contacts 251 removes the short circuit to the upper winding of relay R10 which now energizes in series with the lower winding of relay R9 over contacts 264 to maintain R9 operated and to operate relay R10. At contacts 252 relay SB5 closes the circuit to operate relay SB6.

Relay SB6 in a manner similar to that described for the other register relays, causes the operation of relay R12 while relay R11 is held operated in a local circuit including the upper winding of relay R12 and the lower winding of R11 when the short-circuit of the upper winding of relay R11 is removed at contacts 281. At contacts 282 relay SB6 closes the circuit to relay SB7. Since the subtract key S7 is not operated the operation of relay SB7 is without effect other than to close the circuit to operate relay SB8 at contacts 322.

Relay SB8 at contacts 351 causes the operation of relay R16 and maintains relay R15 operated. At contacts 352 relay SB8 closes the circuit to operate SB9. Relay SB9 at contacts 381 causes the operation of relay R18 and maintains relay R17 operated. At contacts 382 relay SB9 closes the circuit to operate SB10. Relay SB10 at contacts 421 causes the operation of relay R20 and maintains relay R19 operated. At contacts 422 relay SB10 operates relay SB11. Relay SB11 at contacts 441 removes the short circuit from around the upper winding of relay R22 to thereby operate relay R22 from ground through the upper winding of relay R22, contacts 464, and through the lower winding of relay R21 to battery. Relay R22 is operated and relay R21 maintained in this circuit. It should be noted that no subtract key is provided in this eleventh register relay unit and also that in the remainder relay units twelve to nineteen, inclusive, no subtract keys are provided and as the twelfth to nineteenth subtract relays SB12 to SB19 are sequentially operated, in a manner obvious from the foregoing description, the corresponding even numbered register relays are operated in their local circuits with their corresponding odd register relays. For example, relay R24 is operated in series with relay R23 for the twelfth register relay unit. Relays R26, R28, R30, R32, R34, R36 and R38 are operated and relays R25, R27, R29, R31, R33, R35 and R37 are held operated by the sequential operations of the subtract relays SB13 to SB19, inclusive.

When slow-to-release relay SL releases after its circuit is opened at contacts 114 by relay SB1, relay SL at contacts 116 opens the locking circuit of relay SB1 which restores. At contacts 111 relay SB1 opens the holding circuit of relay R2 which releases. At contacts 112 relay SB1 opens the circuit to relay SB2 which releases. The release of relay SB2 at this time does not effect the second register relay unit but at contacts 152 relay SB2 opens the circuit to relay SB3. At back contacts 191 relay SB3 completes a circuit for releasing relay R5 and for holding relay R6 as follows: from ground at make contacts 175, back contacts 181, operated key A3, back contacts 191, operated key S3, make contacts 215 where the circuit divides one branch extending through the lower winding of relay R6 to maintain this relay operated and the other branch extending over contacts 203 and through the upper winding of relay R5 to battery. Relay R5 being a differential relay releases in response to the closure of this circuit. At contacts 205 relay R5 removes the short circuit from relay R8 which now operates in series with the lower winding of relay R7 which is held operated. At contacts 192 relay SB3 opens the circuit to relay SB4 which restores. Relay SB4 at contacts 222 causes the release of relay SB5.

Relay SB5, upon restoring, completes a circuit for holding relay R10 operated and for releasing relay R9 as follows: from ground, make contacts 235, key A5, back contacts 251, operated key S5, make contacts 275 where the circuit divides one branch extending through the lower winding of relay R10 to hold this relay and the over branch extending over contacts 263 and through the upper winding of differtntial relay R9 to cause the release of R9. Relay R9 at back contacts 265 completes a circuit from ground over contacts 281 of the still operated subtract relay SB6, operated key S6, make contacts 315, one branch through relay R12 to hold this relay and the other branch extending over contacts 303 and upper winding of relay R11 to cause the release of relay R11. Relay R11 at contacts 305 opens the short circuit around the upper winding of relay R14 to cause relay R14 to operate in series with relay R13. At contacts 252 relay SB5 opens the circuit to relay SB5 which releases after the preceding register relay operations.

At contacts 281 relay SB6 opens the holding circuit through the lower winding of relay R12 which restores and at contacts 282 relay SB6 opens the circuit to relay SB7. At contacts 321 relay SB7 opens the holding circuit of relay R14 which restores and at 322 opens the circuit to relay SB8.

Relay SB8 at contacts 351 completes a circuit for holding relay R16 operated and for releasing relay R15 from make contacts 335. At contacts 365 relay R15 completes a circuit through make contacts 381 and operated key S9 for holding R18 operated and for releasing relay R17. At contacts 405 relay R17 completes a circuit through make contacts 421 and operated key S10 for holding relay R20 operated and for releasing relay R19. At contacts 435 relay R19 completes a circuit through make contacts 441 for holding relay R22 operated and for releasing relay R21. In a manner similar to that just described the succeeding odd register relays of the remaining register relay units are released in succession by the release of the preceding odd register relays and the associated even numbered register relays in the remaining units are held in operated position. Therefore, relays R23, R25, R27, R29, R31, R33, R35 and R37 are restored while relays R24, R26, R28, R30, R32, R34, R36 and R38 are held operated. Relay SB8 at contacts 352 opens the circuit to relay SB9 which restores.

Relay SB9, upon restoring, at contacts 381 opens the holding circuit of relay R18 and at contacts 382 opens the circuit to relay SB10 which restores. The subtract relays SB10 to SB19 restore in succession and each subtract relay opens the holding circuit to the associated even numbered register relay to cause these even numbered register relays to restore in succession. Relays R20, R22, R24, R26, R28, R30, R32, R34, R36 and R38 are therefore restored.

From the foregoing it will be seen that in response to the receipt of one subtractive input over the S lead the odd register relays R1, R5, R9, R11, R15, R17, R19, R21, R23, R25, R27, R29, R31, R33, R35 and R37 are in their released position to light their associated lamps. The number registered on the register relay units is the binary number 11111111111110110101 which is decimal number 524,213. Since only 17 lamps are provided, one for each of the first seventeen register relay units, then lamps L1, L3, L5, L6, L8, L9, L10 to L17, inclusive, are therefore illuminated to display the ambiguous binary number

11111111110110101

(decimal number 130,997). Since this binary number is considerably larger than the set negative limit, the operator is aware of this fact by the excessive lighting of the display lamps. In addition the negative limit chain circuit through the negative limit keys N is open at several points and therefore no circuit is completed to the negative limit relay NS at this time so that the operator does not receive an indication that the negative limit has been reached.

In case a second subtractive input is received the register relays and the subtract relays operate in a manner obvious from the foregoing description to again add the binary number

1111111111110110101

(524,213) to the previous registered total as follows:

| | | |
|---|---|---|
| 1st previous total | 1111111111110110101 | (524, 213) |
| Add | 1111111111110110101 | (524, 213) |
| Sum total | 11111111111101101010 | (1, 048, 426) |

In the above sum total the following odd register relays R3, R7, R11, R13, R17 to R37 inclusive are in released position to light lamps L2, L4, L6, L7, L9 to L17, inclusive.

Additional subtractive inputs cause the operation of the register relays in a similar manner until the negative limit has been reached or exceeded.

In order to further describe the operations of the register relay units after a number of additive inputs has been received and then the first subtractive input is received, it will now be assumed that eleven additive inputs have been registered on the register units after which a subtractive input is received. In this case the eleven additive inputs equal 77 (or 11×7) or binary number 1001101 and therefore the odd register relays R1, R5, R7 and R13 are in released position to light lamps L1, L3, L4 and L7 to display an indication that the binary number 1001101 is registered in the register relay units. In addition the following even numbered register relays are operated R4, R6, R10 and R14.

It will now be assumed that a subtractive input is received to cause the sequential operation and release of the SB subtract relays. One cycle of operation of the subtract relays as previously described adds the binary number

1111111111110110101

(524,213) to the registered binary number 1001101 (77) as follows:

| | |
|---|---|
| 1001101 | = registered number (77) |
| 1111111111110110101 | = add (524,213) subtract number (75) |
| 0000000000000000010 | = (decimal number 2) |

The following is a detail circuit description of the above noted subtraction effectively accomplished by adding a large number. When relay SB1 operates in response to the receipt of the subtractive input pulse over lead S it completes a circuit at 111 for operating relay R1 through its lower winding. At contacts 135 relay R1 completes a circuit for holding relay R4 and for releasing relay R3 which restores and opens the holding circuit to relay R6 which likewise restores.

Relay SB1 at contacts 112 closes the circuit to SB2 which operates and closes the circuit to relay SB3 at 152. Relay SB3 at 191 completes a circuit for operating relay R5 through its lower winding. At 205 relay R5 completes a circuit for operating relay R7. At 235 relay R7 completes a circuit for holding relay R10 and for releasing relay R9. Relay R9 at 265 removes the short circuit from relay R12 which now energizes in series with relay R11. At 192 relay SB3 closes the circuit to relay SB4 which operates and in turn completes the circuit to relay SB5 at 222. At 251 relay SB5 opens the holding circuit of relay R10 which restores and at 252 completes the circuit to SB6 which operates.

At 281 relay SB6 completes a circuit for holding relay R12 and for restoring relay R11. At 305 relay R11 opens the holding circuit of relay R14 which restores. At 282 relay SB6 closes the circuit to relay SB7 which operates and closes the circuit to relay SB8 at 322.

Relay SB8, upon operating, at 351 completes a circuit for holding relay R16 and for releasing relay R15. At 365 relay R15 removes the short circuit from relay R18 to permit relay R18 to operate in series with relay R17 which is held operated. At 352 relay SB8 closes the circuit to relay SB9 which operates.

Relay SB9 at 381 completes a circuit for holding relay R18 operated and for releasing relay R17 by connecting ground to the lower winding of relay R18 and by connecting ground through 403 and the upper winding of relay R17. The upper and lower windings of relay R17 are differential and the relay accordingly restores. At 405 relay R17 removes the short circuit from relay R20 to permit relay R20 to operate in series with the lower winding of relay R19 which is held operated in this circuit. At 382 relay SB9 closes the circuit to operate relay SB10.

Relay SB10 at 421 completes a circuit for holding relay R20 operated and for releasing relay R19 by connecting ground to the lower winding of relay R20 and by connecting ground through 405 and the upper winding of relay R19. Differential relay R19 releases due to its two windings being energized in opposition. At 435 relay R19 removes the short circuit from relay R22 to permit relay R22 to operate in series with relay R21 which is maintained operated. At 422 relay SB10 closes the circuit to operate relay SB11.

Relays SB11 to SB19, inclusive, operate in the same manner as described for relays SB9 and SB10 and also control their associated register relay units in a similar manner. That is, the operation of relay SB11 causes the release of relay R21 while relay R22 is held and the operation of relay R24 while relay R23 is held operated. The operation of relay SB12 causes the release of relay R23 while R24 is held operated and the operation of relay R26 while relay R25 is held. In a similar manner the odd register relays R25, R27, R29, R31, R33, R35 and R37 are released and the even register relays R26, R28, R30, R32, R34, R36 and R38 are held operated.

Slow-to-release relay SL releases a predetermined time after its circuit is opened at 114 by the operation of relay SB1 and relay SL at 116 opens the locking circuit to relay SB1 which restores.

Relay SB1, upon releasing, at 111 removes the short circuit from around the upper winding of relay R2 whereupon relay R2 operates in a local circuit in series with the lower winding of relay R1 to maintain R1 operated. At 112 relay SB1 opens the circuit to relay SB2. Relay SB2 at 152 opens the circuit to relay SB3 which restores.

Relay SB3 at 191 removes the short circuit from relay R6 which now operates in a local circuit with relay R5 which is held operated. At 192 relay SB3 opens the circuit to relay SB4 which restores. At 222 relay SB4 opens the circuit to relay SB5 which restores.

Relay SB5, at 251 completes a circuit from make contact 235, key A5, back contacts 251, operated key S5, back contacts 275, and through the lower winding of relay R9 to battery. Relay R9 operates and at 265 removes the holding ground from relay R12 which restores. At 252 relay SB5 opens the circuit to relay SB6 which restores.

Relay SB6 at 281 completes the circuit through the lower winding of relay R11 which operates. At 305 relay R11 completes a circuit through the lower winding of relay R13 which operates. At 335 relay R13 opens the holding circuit of relay R16 which restores. At 282 relay SB6 opens the circuit of relay SB7 which restores. At 322 relay SB7 opens the circuit of relay SB8 which restores.

Relay SB8 at 351 completes a circuit through the lower winding of relay R15 which operates. At 365 relay R15 opens the holding circuit of relay R18 which restores. At 352 relay SB8 opens the circuit of relay SB9 which restores.

Relays SB9 to SB19, inclusive, restore in succession and cause the operation of the successive odd register relays and the release of the successive even register relays in the same manner as described for the release of relay SB8. That is, odd register relays R17 to R37, inclusive, are successively operated and the even register relays R20 to R38, inclusive, are successively released.

In response to the receipt of this last subtractive input, relay R3 is the only odd register relay which is in released position while only the even register relays R2, R4 and R6 are operated. Since relay R3 is the only odd register relay which is released, then the register relay units have been operated to register the binary number 10 (decimal 2). Therefore, with the decimal number 77 registered in the register in the binary form, and with the addition of the binary number equivalent to decimal number 524,213 (which effectively subtracts decimal number 75 from the previous registration) the result is a binary number equivalent to decimal 2 as illustrated previously near the beginning of this explanation. From the foregoing it can therefore be seen that the addition of a subtractive input effectively subtracts a predetermined amount from a previous registration.

NEGATIVE LIMIT

Additive and subtractive inputs continue until a positive limit is reached as previously described or until a negative limit is reached or exceeded, it being understood that successive inputs may be either additive or subtractive.

As previously described, the negative limit as set by the operated negative limit keys N12, N13, N14 and N17 corresponds to the binary number 10011100000000000 (decimal number 79,872) and when this number is reached or exceeded a circuit is completed to operate the negative limit relay NS which operates a signal and the negative limit register.

In order to describe the results of reaching or exceeding a negative limit, it will be assumed that sufficient subtractive inputs have been received to register a very large ambiguous number. For example it will be assumed that the last nineteen digit orders in the binary form registered for this number is 1110011100000100010 and therefore the odd register relays R37, R35, R33, R27, R25, R23, R11 and R3 are in their released positions to register this corresponding number. The next subtractive input to be added to this number will cause the registration to reach the negative limit but at this particular instant the negative limit circuit to relay NS is now open at make contacts 302 of released relay R11 and is also open at make contacts 172 of released relay R3.

In response to the next subtractive input the subtract relays are operated and released as previously described to add the binary number 1111111111110110101 (524,213) to the previous registration as follows.

```
1110011100000100010 (registered number)
1111111111110110101 (add 524,213)
───────────────────
11110011011111010111 total
```

The description of the above noted addition in response to the next subtractive input will now be described in detail as follows:

Odd register relays R37, R35, R33, R27, R25, R23, R11 and R3 are in released position and even numbered relays R34, R30, R24, R14, R12, R6, R4 and R2 are in operated position when binary number 1110011100000100010 is registered in the register relay units.

Relay SB1 operates and locks in response to the receipt of the incoming subtract input pulse over lead S. The subtract relays SB1 to SB19, inclusive, operate sequentially to control the register relays and thereafter release sequentially to further control the register relays in a manner obvious from the foregoing descriptions with the result that after the release of the last subtract relay SB19 the following binary number 11100110111111010111 is registered by the odd relays R37, R35, R33, R27, R25, R21, R19, R17, R15, R13, R9, R5, R3 and R1 in their released positions while the even relays R34, R30, R26, R24, R14, R12, R10 and R8 being in their operated positions. With the last mentioned odd relays in their released positions the following lamps L17, L14, L13, L11, L10, L9, L8, L7, L5, L3, L2, L1 are illuminated to indicate the binary number 10011011111010111.

Since only the negative limit keys N17, N14, N13 and N12 are operated the circuit for operating the negative limit relay NS will be closed for the first time in response to the last mentioned registration.

When the last subtract relay SB19 is operated said relay at make contacts 238 completes a circuit for operating slow-to-release relay NL which at contacts 308 prepares a circuit for grounding the negative limit control conductor NC. When relay SB19 releases said relay at back contacts 238 momentarily connects ground through contacts 308 to conductor NC. A circuit may now be traced for operating the negative limit relay NS as follows: from grounded conductor NC, closed contacts 492 of operated key N12, make contacts 426 of operated odd relay R23, closed contacts 495 of operated key N13, back contacts 454 of released relay R25, closed contacts 413 of operated key N14, back contacts 484 of relay R27, normally closed contacts 324 of key N15, make contacts 326 of relay R29, normally closed contacts 323 of key N16, make contacts 354 of relay R31, closed contacts 313 of operated key N17, back contacts 384 of relay R33, back contacts 226 of relay R35, contacts 254 of relay R37, and through the upper winding of relay NS to battery. Relay NS at contacts 291, completes a locking circuit for its lower winding controlled by the battery and ground connections supplied from Fig. 1A as previously described. Shortly after the release of relay SB19 relay NL releases to remove ground from conductor NC.

Negative limit relay NS at contacts 292 completes a circuit to the negative limit lamp NSL to light said lamp and indicate to the operator that the negative limit has been reached. At 293 relay NS completes the circuit for operating the negative limit register NLR and operates contacts 294 and 295 to control other, or remote, negative limit signals, if desired.

When the operator observes that the negative limit has been reached, further inspection of the parts will stop and the lot under test will be rejected as bad. The operator then operates the switch SW in Fig. 1A to disconnect battery and ground conections to release the apparatus to normal.

It should be noted that each of the limit keys are provided with a plurality of contacts so that the limit circuits can be closed at several points even though the limit may be exceeded by a fairly large number.

In order to assist in further understanding the circuit operations without describing the detail circuit operations which take place for each and every input pulse received, the further following explanation is given. That is, any binary number may be added to any other binary number and from the additive total of these binary numbers the operated or released conditions of the various register relays may be determined. The binary digit 1, for any digit order, indicates that that odd register relay is in released position.

At the end of any input (additive or subtractive) and after either the adding relays AD or the subtracting relays SB have completed their cycle of operation and release, the following basis may be followed to determine the operated or released condition of the even numbered register relays directly from the instant registered number.

1. If an odd register relay is energized to register a zero, the corresponding even register relay is in released position in case the preceding odd register relay is in operated position also registering a zero. That is, two adjacent binary numbers "0" and "0," where the second "0" is the preceding registration, then in this case the even numbered register relay associated with the first "0" is in released position.

*No. 1 example*

R5 (operated), R6 (released), R3 (the operated preceding register relay)
0  0 (registered binary number)

2. If an odd register relay is energized to register "0," the corresponding even register relay is in operated position in case the preceding odd register relay is in released position to register "1."

*No. 2 example*

R5 (operated), R6 (operated), R3 (the released preceding register relay)
0  1 (registered binary number)

3. If an odd register relay is in released position to register "1," the corresponding even register relay is in operated position in case the preceding odd register relay is in operated position to register "0."

*No. 3 example*

R5 (released), R6 (operated), R3 (the operated preceding register relay)
1  0 (registered binary number)

4. If an odd register relay is in released position to register "1," the corresponding even register relay is in released position in case the preceding odd register relay is in released position to register "1."

*No. 4 example*

R5 (released), R6 (released), R3 (the released preceding register relay)
1  1

What is claimed is:

1. In a binary calculating device, first and second sets of keys, each key of each set corresponding to a different binary digit order in a binary number and corresponding keys of each set being of the same binary digit order, said keys operable manually by an operator in different combinations to designate different binary numbers, register relays for registering binary numbers, each register relay being individual to a different binary digit order in a binary number, means for electrically transmitting additive inputs and subtractive inputs to said device, means responsive to the receipt of each additive input for operating certain of said register relays to add the binary number corresponding to the manually operated ones of said keys in said first set to a previously registered binary number, and means responsive to the receipt of each subtractive input for operating certain of said register relays to add a predetermined binary number and the binary number corresponding to the manually operated ones of said keys in said second set to a previously registered binary number to thereby effectively subtract a given number from said previously registered binary number.

2. In a binary calculating device, a set of keys, each key corresponding to a different binary digit order in a binary number, each key having a normal position corresponding to zero in its corresponding binary digit order and each key having an operated position corresponding to the binary numeral one in its corresponding binary digit order, register relays for registering binary numbers, each register relay corresponding to a different binary digit order and being individual to a corresponding one of said keys, pulsing contacts individual to each register relay, means for sequentially operating said individual pulsing contacts, means responsive to the operation of said individual pulsing contacts for operating only those register relays having their individual keys in operated position to add the binary numeral one to the binary digit order corresponding thereto, and means for operating a higher binary digit order register relay in response to a carryover operation from the next lower binary digit order register relay between successive closures of said pulsing contacts.

3. In a binary calculating device, a set of manually operable keys, each key corresponding to a different binary digit order in a binary number, register relays for registering binary numbers, each register relay corresponding to a different binary digit order in a binary number; a series circuit for each binary digit order of an ultimate binary number comprising contacts on a lower binary digit order register relay, the key corresponding to the instant binary digit order, and windings on the instant binary digit order register relay for controlling carryovers from a lower order series circuit to the instant order series circuit; pulsing contacts connected to each said series circuit, means for operating said pulsing contacts, and circuit means responsive to the operation of said pulsing contacts for controlling the operation of only the register relays in each said series circuit having its corresponding keys in operated condition.

4. In a binary calculating device, a set of manually operable keys, each key corresponding to a different binary digit order in a binary number, register relays for registering binary numbers, each register relay corresponding to a different binary digit order in a binary number, a series circuit for each binary digit order of an ultimate binary number, each series circuit including a corresponding register relay and a corresponding key, a chain circuit including successive ones of said series circuits connected in the order corresponding to their binary digit order for controlling carryover operations of said register relays from a lower order series circuit to the next highest order series circuit, and pulsing means individual to each series circuit effective to operate the corresponding register relay only in case the corresponding key at such series circuit has been manually operated.

5. In a binary calculating device comprising a series of registering units each corresponding to a different binary digit order in a binary number, each registering unit including register relays, a key, pulsing contacts and relay contacts of the next lower order register unit; means for operating said pulsing contacts in each register unit, a circuit in each register unit responsive to the operation of its corresponding pulsing contacts for controlling the operation of the register relays in such unit to add the binary numeral one thereto only in case the associated key in such unit is operated, and a circuit in each register unit controlled by said relay contacts in response to the operation of one of said register relays in a lower order register unit for controlling the operation of said register relays in the next higher order register unit to effect a carryover from said lower order to said next higher order register unit.

6. In a binary calculating device comprising a series of registering units each corresponding to a different binary digit order in a binary number, each registering unit including register relays, a key, pulsing contacts and relay contacts of the next lower order register unit; means for operating said pulsing contacts in each register unit, a circuit in each register unit responsive to the operation of its corresponding pulsing contacts for controlling the operation of the register relays in such unit to add the binary numeral one thereto only in case the associated key in such unit is operated, a circuit in each register unit controlled by said relay contacts in response to the operation of one of said register relays in a lower order register unit for controlling the operation of said register relays in the next higher order register unit to effect a carryover from said lower order to said next higher order register unit, and indicating means individual to each registering unit controlled by the operated condition of the register relays in such unit for designating the binary number registered.

7. In a binary calculating device, a pair of register relays for each binary digit order in a binary number, a chain circuit interconnecting each pair of register relays with the next lower binary digit order register relays, circuit means including each chain circuit for operating the first register relay of each pair in response to alternate operations of the first register relay in the next lower binary digit order register relays and for releasing said first register relay in response to the intervening operations of said next lower binary digit order first register relay, circuit means for operating the second register relay of each pair in series with its associated first register relay in response to alternate release operations of the first register relay in the next lower binary digit order and for releasing said second register relay in response to the intervening release operations of said next lower binary order first register relay, and means connected to each chain circuit for operating any predetermined ones of said first register relays.

8. In a binary calculating device as claimed in claim 7 including indicating means individual to each said first register relay for indicating the binary numeral registered therein dependent upon the operated or released condition of the corresponding first register relay.

9. In a calculator comprising a series of register relay units, a series circuit for interconnecting each adjacent relay unit, each register relay unit including an odd register relay and an even register relay, means for operating a succeeding odd register relay over the said series circuit interconnecting a succeeding relay unit with a preceding relay unit in response to the operation of the preceding odd register relay, means for operating the succeeding even register relay associated with said operated succeeding odd register relay over a circuit local to the corresponding register relay unit in response to the release of said preceding odd register relay, means for releasing said operated succeeding odd register relay and for maintaining said operated succeeding even register relay operated in response to a reoperation of said preceding odd register relay, said operated succeeding even register relay released in response to the release of said reoperated preceding odd register relay, and register indicating means controlled by said odd register relays.

10. In a calculator comprising a series of register relay units, a series circuit between each adjacent relay unit for interconnecting said adjacent relay units, each register relay unit including an odd register relay and an even register relay, means for operating an odd register relay in response to connecting a potential to the said series circuit between adjacent relay units, means for operating the even register relay associated with said operated odd register relay over a circuit local to the relay unit containing said operated odd relay in response to the disconnection of said potential from said series circuit, means for releasing said operated odd register relay and for maintaining operated said operated even register relay in response to a reconnection of said potential to said series circuit, said operated even register relay released in response to the subsequent disconnection of said potential from said series circuit, and means for controlling the connection and disconnection of said potential to said series circuit.

11. In a binary calculating device, a set of manually operable keys, each having a normal and an operated position, each key being individual to a different binary digit order in a binary number, register relays for registering binary numbers, each register relay being individual to a different binary digit order and being individual to one of said keys, a series chain circuit including interconnections between said register relays and said keys arranged in a predetermined order corresponding to the binary digit order of said register relays and said keys, a chain of relays, each relay of said chain being individual to a corresponding register relay, means for sequentially operating said chain relays in a predetermined order corresponding to the binary digit order of said register relays and said keys, and circuit means connected to said series chain circuit controlled by said sequentially operated chain relays for operating certain of said register relays dependent upon the keys which have been manually set in their operated positions to register a binary number corresponding to said manually operated keys set in their operated positions.

12. In a binary calculating device, a set of keys each having a normal and an operated position, each key being individual to a different binary digit order in a binary number, register relays for registering binary numbers, each register relay being individual to a different one of said keys and to the corresponding binary digit order, a series chain circuit including said keys interconnecting said register relays in a predetermined order corresponding to said binary digit order, certain of said keys being manually set in their operated positions in accordance with an additive binary number, means for electrically transmitting additive inputs to said device, and circuit means connected to said series chain circuit operative in response to each additive input received for operating said register relays in accordance with said operated keys to cumulatively add said additive binary number to a previous registered binary number.

13. In a binary calculating device, a first set of manually operable keys set by an operator to register a predetermined positive binary number, a second set of manually operable keys set by an operator to register a predetermined negative binary number, a third set of manually operable keys set by an operator to register a predetermined additive binary number, a fourth set of manually operable keys set by an operator to register a predetermined subtractive binary number, register relays for registering binary numbers, each register relay being individual to a different binary digit order in binary numbers, means for electrically transmitting additive and negative inputs to said device, means operative responsive to each additive input received for operating said register relays to cumulatively add said predetermined additive binary number to a previously registered binary number, means operative to each negative input received for operating said register relays to subtract said predetermined subtractive binary number from the previously registered binary number, positive limit indicating means controlled by said first set of keys operative in response to said register relays registering a resultant amount corresponding to said predetermined positive binary number, and negative limit indicating means controlled by said second set of keys operative in response to said register relays registering a resultant amount corresponding to said predetermined negative binary number.

14. In a binary calculating device, a set of keys, each key corresponding to a different binary digit order in binary numbers up to a given value, said keys operable manually by an operator in different combinations to designate different binary numbers, register relays for registering binary numbers, each register relay being individual to a different binary digit order in a binary number, means for electrically transmitting additive inputs to said device, means operative responsive to the receipt of each said input for operating certain of said register relays to add the binary number corresponding to said manually operated keys to a previously registered binary number, a second set of keys, each key of said second set corresponding to a different binary digit order in a binary number up to a predetermined binary number, said second set keys operable manually by an operator in different combinations to designate different binary numbers, a chain circuit completed through the operated ones of said second set keys by said register relays in response to said register relays being operated to register a total equal to or greater than the binary number designated by said operated second set keys, and indicating means operated in response to the completion of said chain circuit.

ROY W. JONES.

REFERENCES CITED

The following references are of record in the file of this patent:

UNITED STATES PATENTS

| Number | Name | Date |
|---|---|---|
| 2,318,591 | Couffignal | May 11, 1943 |
| 2,364,540 | Luhn | Dec. 5, 1944 |
| 2,394,924 | Luhn | Feb. 12, 1946 |
| 2,394,925 | Luhn | Feb. 12, 1946 |

FOREIGN PATENTS

| Number | Country | Date |
|---|---|---|
| 410,129 | Great Britain | May 9, 1934 |